US006937284B1

(12) United States Patent
Singh et al.

(10) Patent No.: US 6,937,284 B1
(45) Date of Patent: Aug. 30, 2005

(54) FOCUSING AID FOR CAMERA

(75) Inventors: Harjit Singh, Redmond, WA (US); Robert T. Kilzer, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 09/813,520

(22) Filed: Mar. 20, 2001

(51) Int. Cl.[7] ............................................. H04N 5/232
(52) U.S. Cl. ...................................... 348/346; 348/349
(58) Field of Search ..................... 348/207.99, 207.1, 348/207.11, 345, 346, 349, 354, 356, 220.1, 348/254, 350; 396/72

(56) References Cited

U.S. PATENT DOCUMENTS 4,775,892 A * 10/1988 Surdyke ..................... 348/345
4,794,459 A * 12/1988 Moberg et al. ............. 348/346
6,526,232 B1 * 2/2003 Mizumura ................... 396/72
6,670,985 B2 * 12/2003 Karube et al. ........... 348/207.1

* cited by examiner

*Primary Examiner*—Tuan Ho
(74) *Attorney, Agent, or Firm*—Ronald M. Anderson

(57) ABSTRACT

An indication of sharpness of focus is provided to a user to assist in focusing a camera. In one embodiment, the camera is coupled to a personal computer. An algorithm is implemented by the personal computer to determine a sharpness of focus based upon differences between the luminance of adjacent pixels in a selected region of an image produced by the camera. A visual or aural indication of the sharpness of focus is provided to the user to enable the user to focus the camera to the sharpest possible focus. Alternatively, the algorithm can be implemented by a processor within a camera so that a visual or aural indicator on the camera provides the indication of sharpness of focus as a user adjusts the focus of the camera.

44 Claims, 6 Drawing Sheets

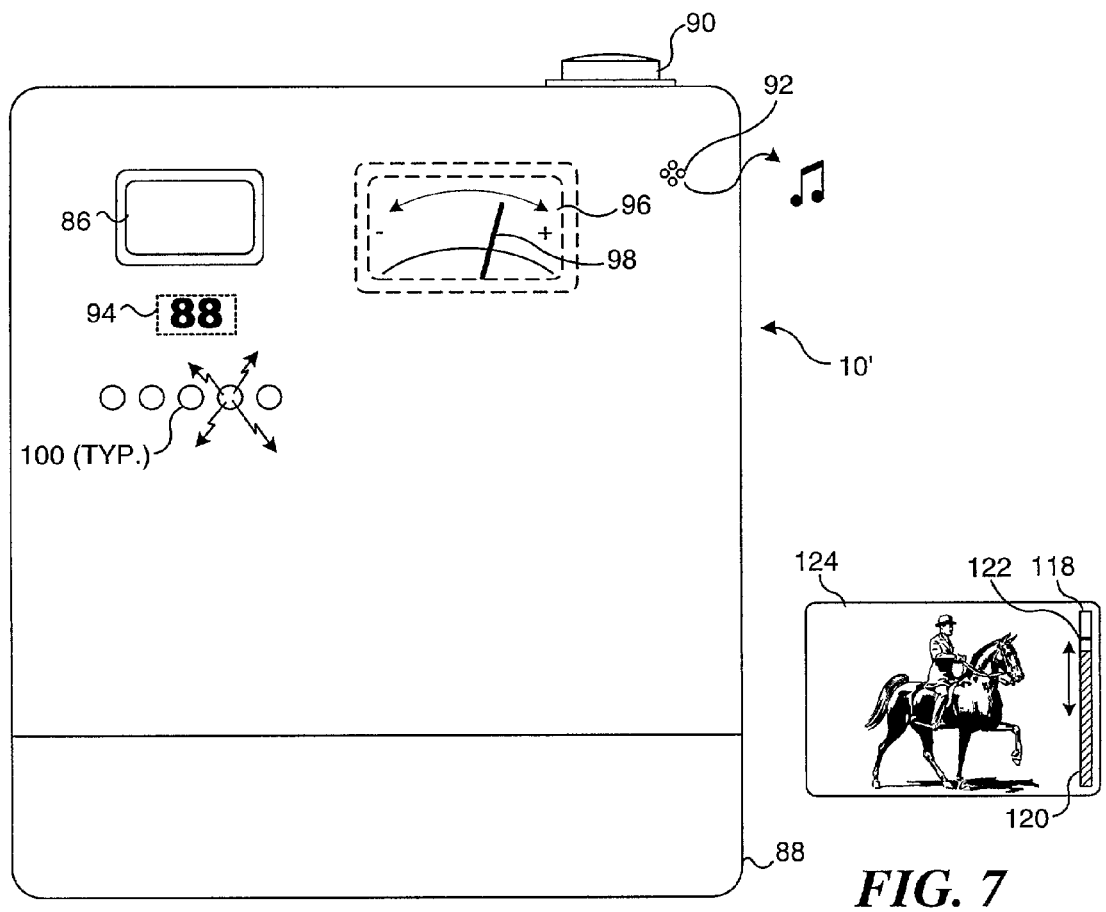
FIG. 5
FIG. 7
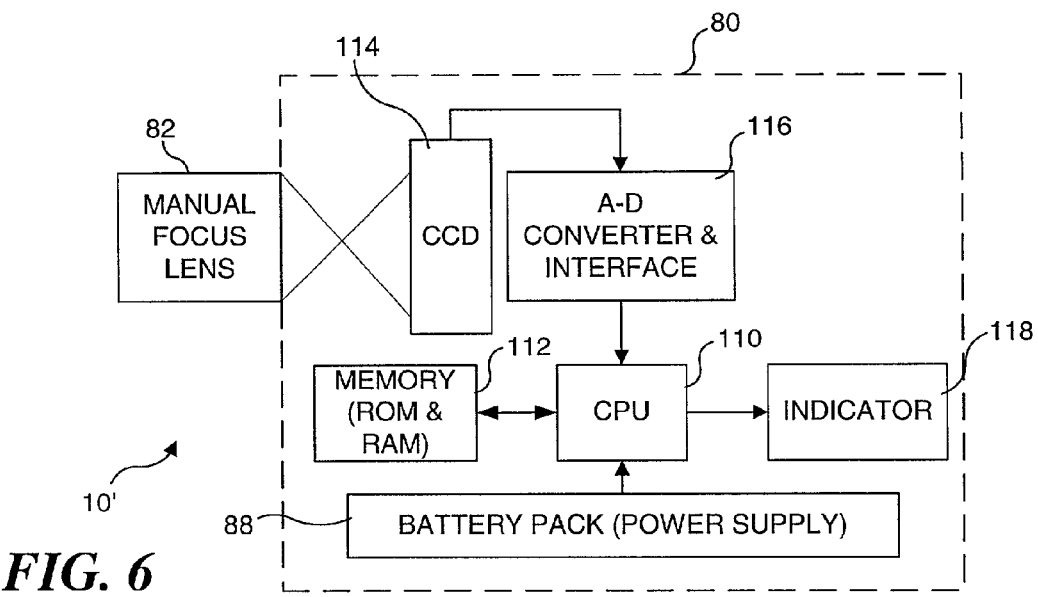
FIG. 6

FOCUSING AID FOR CAMERA

FIELD OF THE INVENTION

The present invention generally relates to a method and system for determining when a camera is properly focused, and more specifically, to assisting a user to manually adjust the focus of a camera by providing an indication of the sharpness of focus of the camera.

BACKGROUND OF THE INVENTION

Broadband access to the Internet has greatly increased the demand for digital video cameras designed for use with a personal computer (PC). These video cameras, which are also known as Webcams, are connected to a PC and used to produce compressed streaming video data for transmission over the Internet, local area, and/or wide area networks. While early cameras of this type were only capable of producing black and white images, the development of low cost transistor-based, i.e., complementary metal oxide semiconductor (CMOS), imaging sensors has enabled reasonably good color images to be produced by PC cameras, although typically at less than full motion frame rates (i.e., less than 30 frames/second). However, to minimize costs, such cameras have relatively few automated controls. For example, they do not include automatic focusing systems like those normally provided on analog or digital video cameras intended for general purpose use in recording images on magnetic tape. On PC cameras, the lens is typically manually adjustable.

Several factors cause the manual focusing of a PC camera to be very frustrating. Unlike more expensive analog or digital cameras for recording images on tape, PC cameras typically do not include a viewfinder. If a viewfinder is provided, the image seen through the viewfinder is not indicative of the lens focus. Instead, the image produced by a camera must be viewed on a PC monitor. Focusing of the lens is normally done in a preview mode. Since the image in preview mode is usually compressed, details that enable the sharpest focus to be visually determined will be less evident than in an uncompressed image. Also, there is inherently a time delay between the point at which an image signal is supplied by a PC camera and the time at which the image is displayed on a monitor. The delay hinders the manual focusing process. A user manually adjusting the focus on a PC camera while viewing the preview image produced by the camera on the monitor may believe that the camera is properly focused, only to watch the image become less sharply focused. The user will have adjusted the focus control past the point of sharpest focus. The time delay between an adjustment and the corresponding effect on the sharpness of the previewed image during the manual focusing process thus makes it difficult to adjust the camera to achieve the sharpest possible image.

Several other factors contribute to the difficulty in focusing a PC camera. Typically, the size of the preview image being viewed on a computer monitor while adjusting the focus is so small that details of the image that might assist in focusing the camera are not evident. Ambient lighting conditions can also adversely impact the user's ability to properly focus a camera. For example, a poorly lighted scene will result in an image with little contrast, causing the sharpness of the focus to be difficult to visually determine. Sunlight or other lighting conditions that cause glare on the computer monitor on which the preview image is being viewed can also interfere with the focus adjustment.

Accordingly, it will be apparent that providing a less subjective indication of focus sharpness would greatly assist a user in manually focusing a PC camera. Although conventional through-the-lens focusing systems and automated focusing features might be provided on a PC camera, the components required for these solutions to the problem are too expensive to implement at the desired price levels of PC cameras. There is thus a clear need for a lower cost solution to this problem.

SUMMARY OF THE INVENTION

In accord with the present invention, a method is defined for assisting a user to manually focus a camera. The method includes the step of digitally processing image data produced by the camera to produce a "sharpness value" corresponding to the sharpness of focus of the camera in at least a portion of an image. As the user manually focuses the camera, an indication of the sharpness of focus achieved is then provided to the user as a function of this value, to enable the user to more objectively adjust the focus of the camera.

In a preferred embodiment, the image data preferably comprises a luminance value for each of a plurality of pixels comprising the image. In this case, the step of digitally processing includes the step of determining a luminance value for pixels disposed in at least the portion of the image in which the sharpness of focus is to be evaluated. Differences in the luminance values of adjacent pixels disposed in this portion of the image are computed, and the sharpness value is then determined as a function of these differences.

Also, the step of determining the sharpness value preferably includes the step of determining a running total of the differences between the luminance values of adjacent pixels in both a horizontal and a vertical direction. While in most cases the portion of the image used to determine sharpness of focus will be the central portion of the image, it is also possible to use the entire image, or the side portions of the image. In addition, the method may optionally include the step of weighting the luminance values in selected regions of the image when determining the sharpness value.

In one form of the invention, the step of providing an indication includes the step of displaying a visual indicator corresponding to the sharpness value so that during the step of manually focusing the camera, the user can visually perceive when the sharpest focus is attained by viewing the visual indicator. For example, the visual indicator may comprise a graphical indicator, such as a bar graph showing the current sharpness value. When displaying the visual indicator, the method preferably includes the step of indicating where the sharpness value was at its maximum, which corresponds to the sharpest focus, to enable the user to adjust the focus the camera back to the point of sharpest focus. Alternatively (or in addition to the visible indicator), an audible sound can be provided that is indicative of the current focus so that the user will know when the sharpest focus is achieved, as the user focuses the camera. In such an embodiment, the audible indication may comprise a sound having a varying audible frequency indicative of the sharpness value.

In one form of the present invention, the user connects the camera in data communication with a host computing device so that the step of digitally processing the image data is carried out by the host computing device. In another embodiment, the step of digitally processing the image data is carried out by a processor within the camera. In this latter embodiment, the visual indication includes at least one of a light having a varying color indicative of the sharpness value, a digital display of a number indicative of the sharpness value, a graphical display indicative of the sharpness value, and a meter that indicates the sharpness value.

Another aspect of the present invention is directed to a memory medium on which machine readable instructions are stored. When the machine readable instructions are implemented by a processor, they cause the steps of the method initially discussed above to be carried out.

Yet another aspect of the present invention is directed to a system that provides an indication of sharpness of focus to assist a user in manually focusing the lens of a camera. This system includes a camera with a lens having a manually adjustable focus control, and a light sensor that produces image data in response to light passing through the lens. A processor is coupled to the light sensor to receive the image data from the light sensor, and an indicator, which is coupled to the processor, provides an indication of a sharpness of focus of the lens. A memory in which a plurality of machine instructions are stored is also included and is coupled to the processor. When these machine instructions are executed by the processor, they cause it to implement a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 5 is a rear elevational view of the digital camera of FIG. 4, illustrating alternative visual indicators that indicate a sharpness of focus to a user;

FIG. 6 is a block diagram of the functional components used in the digital camera of FIGS. 4 and 5 to implement the present invention;

FIG. 7 is a view of an image through the viewfinder of the digital cameral of FIGS. 4–6, showing a bar graph indicator of focus sharpness that is displayed to a user.

DESCRIPTION OF THE PREFERRED EMBODIMENT

Figure 1:
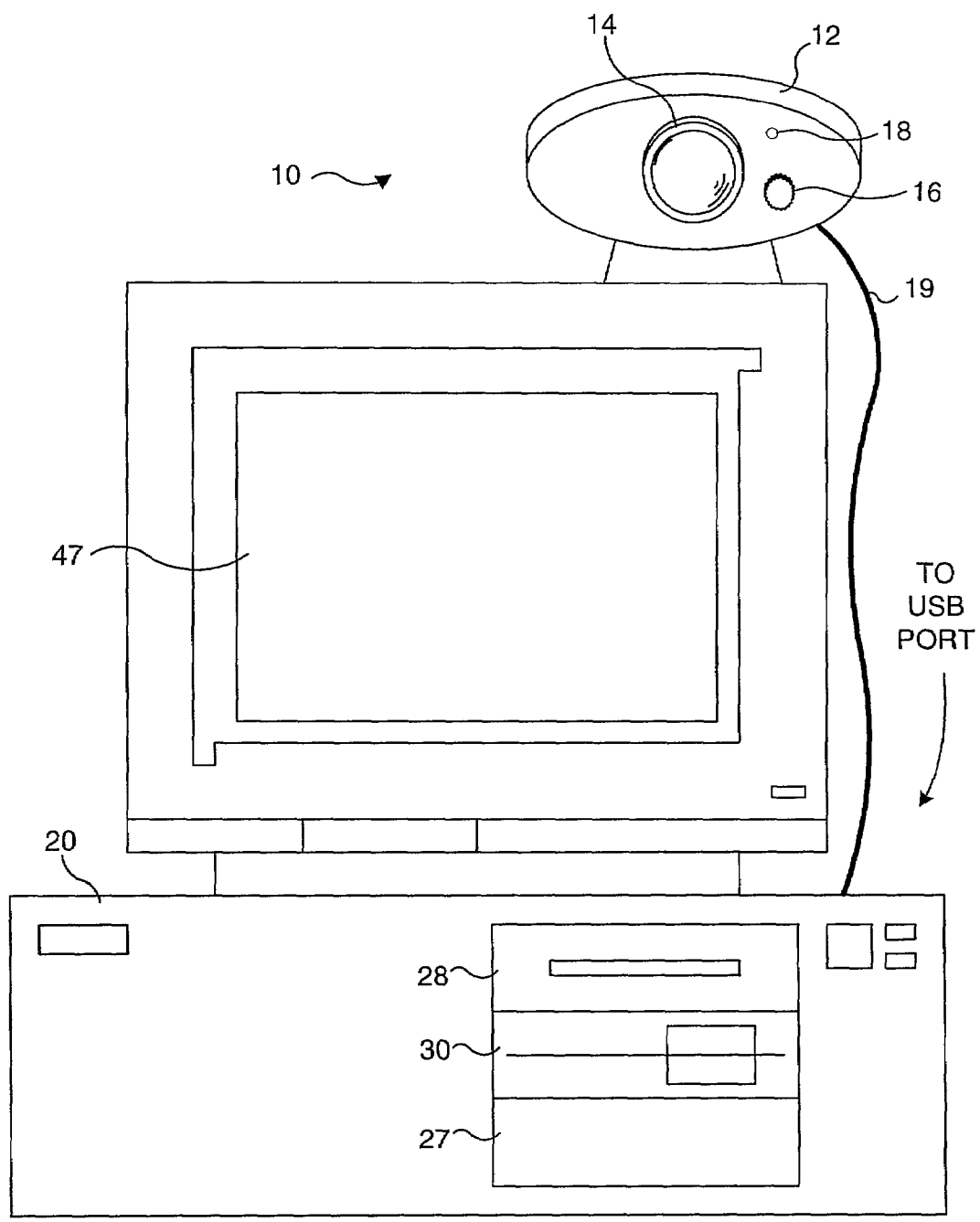
FIG. 1 is an elevational view of a generally conventional PC (keyboard and pointing device not shown) that includes a digital camera, which is focused using the present invention.

As shown in FIG. 1, an exemplary PC camera 10 includes a relatively compact housing 12 having a lens 14 disposed on the front surface of the housing. A focus control knob 16 is also included on the front housing and an indicator light 18, which typically comprises a light emitting diode (LED) is provided on the front of the housing and is periodically illuminated to indicate when PC camera 10 is actively capturing images through lens 14. Other types of cameras are focused by rotating a bezel (not shown) around lens 14, or by rotating the lens itself to change its focal point. PC camera 10 is specifically designed for use with a host computing device such as a PC 20 as shown in FIG. 1.

While it is possible that PC camera 10 can be used with other types of host computing devices, it will most likely to be used with a PC, such as PC 20 as shown in this Figure. A lead 19 is used to couple PC camera 10 to an appropriate input port, such as a universal serial bus (USB) port. Alternatively, other input/output (I/O) ports on the computer can be used, depending upon the format of the signal provided by PC camera 10. While it can be placed in other locations, PC camera 10 is frequently positioned atop a monitor 47. The video images that the PC camera produces are displayable on monitor 47 using appropriate software executed by PC 20. This software can be transferred from a floppy disk drive 28, a compact disk-read only memory (CD-ROM) drive 30, or other memory media, or conveyed through an Internet connection to PC 20 for storage on a hard drive 27. Appropriate software programs that facilitate the use of a typical PC camera are typically included with the camera when it is purchased. The software programs facilitate the use of the PC camera in producing still images and video clips and enable a user to preview images on monitor 47. By viewing the preview image, the user can direct the camera at the desired subject so that the subject is framed properly and, more importantly, the user can focus lens 14 so that the images produced by PC camera 10 are as sharp as possible.

In the configuration illustrated, PC camera 10 will typically be used to produce video clips for transmission by PC 20 over the Internet or other network, for viewing on the monitors of other PCs that are coupled to the network. Video clips produced by the PC camera can also be attached to emails that are transmitted over the Internet or other networks. The software that facilitates the use of the video clips produced by PC camera 10 will normally provide a compressed preview image that is displayed on monitor 47. One of several different compression schemes is typically employed in producing the preview image. A user will typically be able to choose a compression scheme and a compression ratio to be applied to the image transmitted over the Internet or other network. Since the amount of video data produced by PC camera 10 in just a few seconds can be quite large, it would be somewhat unusual for a user to transmit uncompressed data over a network. The compression schemes that are used are currently of the lossy type, e.g., the Joint Photographic Experts Group (JPEG) compression algorithm. With this and other related lossy type compression algorithms, the quality of the image is reduced as more compression is applied to a video image. Accordingly, since the preview image is generally compressed, the present invention substantially enhances the user's ability to focus lens 14, as explained below.

Exemplary Operating Environment

Figure 2:
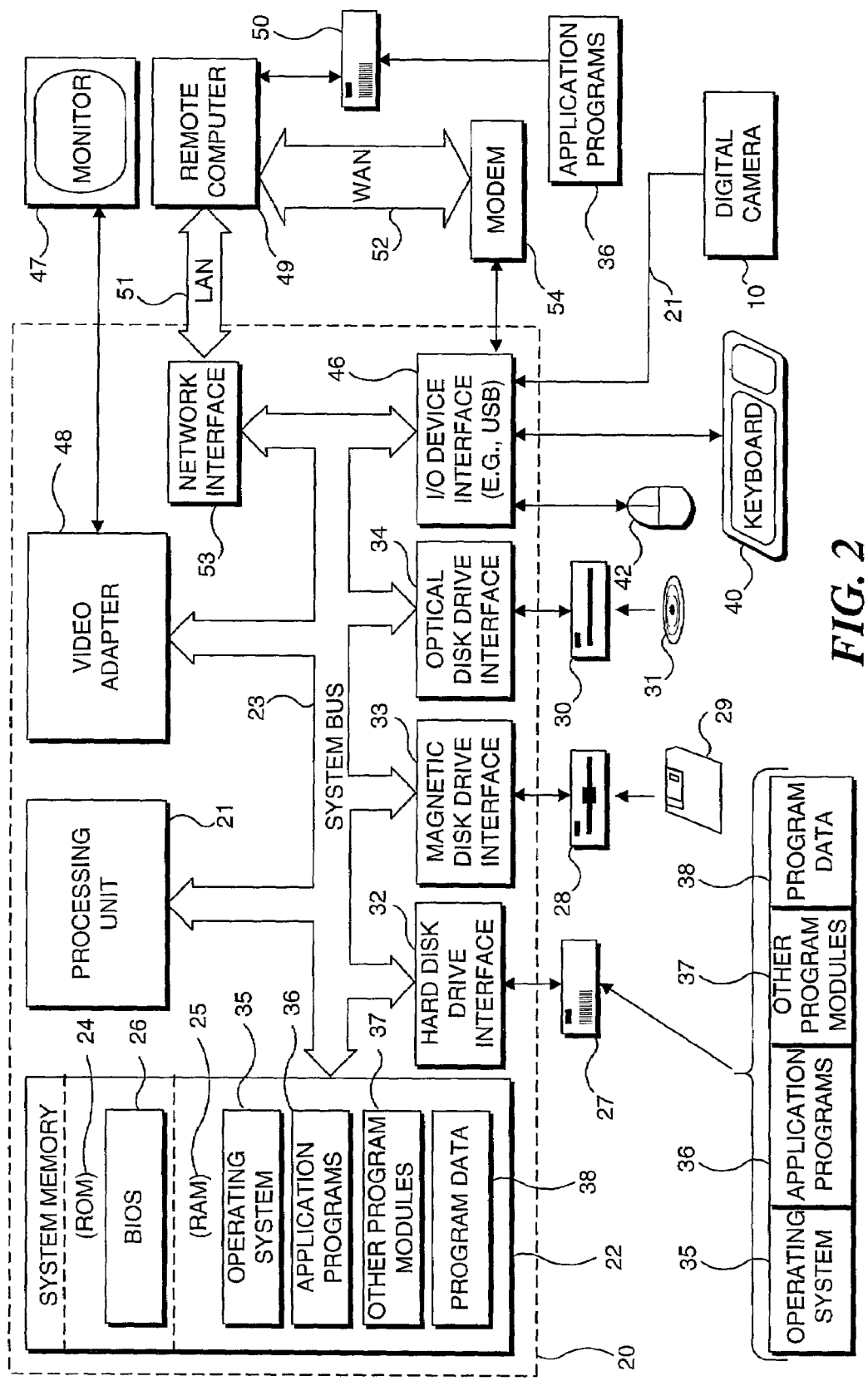
FIG. 2 is a functional block diagram of a conventional PC system that is suitable for implementing the present invention.

FIG. 2 and the following discussion are intended to provide a brief, general description of a suitable computing environment in which the image processing of the present invention may be implemented. Although not required, the present invention will be described in the general context of computer-executable instructions, such as program modules that are executed by a host computing device configured as a PC. It must be emphasized, however, that the present invention is usable on other types of computing devices. Generally, program modules include routines, programs, objects, components, data structures, etc. that perform particular tasks or implement particular abstract data types. The present invention will preferably be practiced in a single host computing device, with one or more processors that process multiple tasks. In a distributed computing environment, program modules may be located in both local and remote memory storage devices.

With reference to FIG. 2, an exemplary system for implementing the present invention includes a general purpose computing device in the form of conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of known bus architectures. The system memory includes read only memory (ROM) 24 and random access memory (RAM) 25. A basic input/output system (BIOS) 26, containing the basic routines that are employed when transferring information between elements within PC 20 and during start up, is stored in ROM 24. As noted above, PC 20 includes hard disk drive 27, for reading from and writing to a hard disk (not shown), magnetic floppy disk drive 28 for reading from or writing to a removable magnetic disk 29, and CD-ROM drive 30 or other optical disk drive for reading from or writing to a removable optical disk 31, such as a CD-ROM, DVD or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable machine instructions, data structures, program modules, and other data for PC 20. Although the exemplary environment described herein employs a hard disk, removable magnetic disk 29, and removable optical disk 31, it will be appreciated by those skilled in the art that other types of computer-readable media, which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36 (such as a browser program—if not part of the operating system), other program modules 37, and program data 38. A user may enter commands and information into PC 20 through input devices such as a keyboard 40 and a pointing device 42. Other input devices (not shown) may include a microphone, joystick, game pad, satellite dish, scanner, camera, or the like. These and other input devices are often connected to processing unit 21 through an input/output (I/O) device interface 46 that is coupled to the system bus and includes serial and parallel ports, as well as USB ports. Output devices, such as a printer (not shown), may also be connected to processing unit 21 through I/O device interface 46 that is coupled to the system bus. Similarly, monitor 47 or other type of display device is also connected to system bus 23 via an appropriate interface, such as a video adapter 48, and is usable to display Web pages and/or other information. In addition to the monitor, PCs may be coupled to other peripheral output devices (not shown), such as speakers (through a sound card or other audio interface—not shown).

PC 20 preferably operates in a networked environment using logical connections to one or more additional computing devices, such as to a remote computer 49 that is yet another PC (or alternatively, a server or a mainframe computer) that typically includes many or all of the elements described above in connection with PC 20, although only an external memory storage device 50 has been illustrated in FIG. 2. The logical connections depicted in FIG. 1 include a local area network (LAN) 51 and a wide area network (WAN) 52. Such networking environments are common in offices, enterprise-wide computer networks, and intranets. Preferably, LAN 51 is a back-end subnet connecting a plurality of resource nodes of the cluster in communication with each other. Preferably, WAN 52 is the Internet.

PC 20 is connected to LAN 51 through a network interface or adapter 53, and to WAN 52 though a network interface or adapter 54. Network interface 54 may be a router, a modem, a cable mode, a digital subscriber line (DSL) interface, or other well-known device for establishing communications over WAN 52 (i.e., over the Internet). Those skilled in the art will recognize that network interface 53 and network interface 54 may be internal or external, and may be the same, or even a single interface device. Network interface 53 and network interface 54 are connected to system bus 23, or may be coupled to the bus via I/O device interface 46, e.g., through a serial, USB, or other communications port.

In a networked environment, program modules depicted relative to PC 20, or portions thereof, may be stored in the remote memory storage device. It will be appreciated that the network connections shown are exemplary and other techniques for establishing a communications link between the computers may be used, such as wireless communications.

Overview of Method for Assisting a User to Focus a Camera

Figure 3:
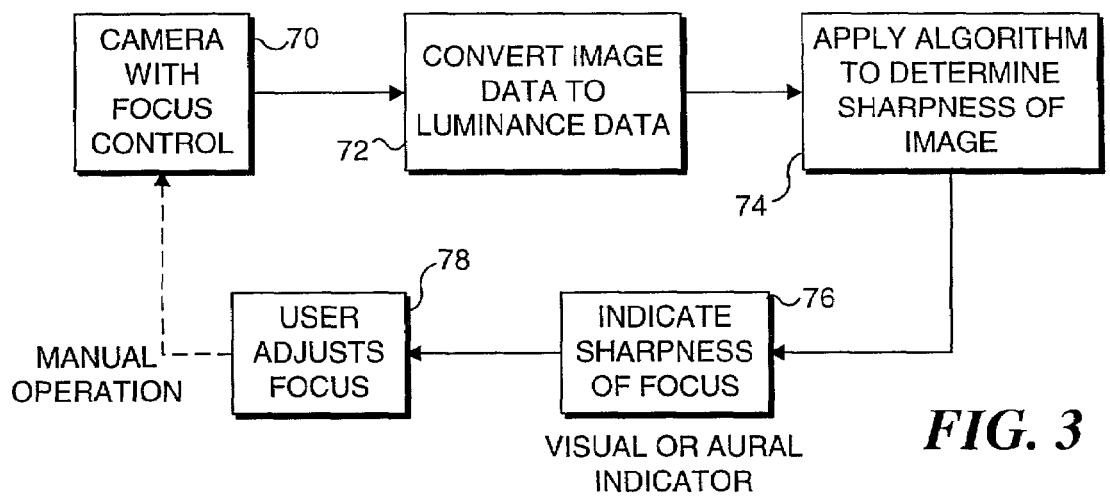
FIG. 3 is a block diagram illustrating the overall steps implemented in the present invention to assist a user in focusing a digital camera.

As illustrated in FIG. 3, the steps implemented by the present invention to assist a user in focusing a camera presume that the camera is provided with a focus control, as shown in a block 70. Such cameras will include a CCD or other type of imaging light sensor (not shown) that produces an output signal conveying image data. In a block 72, the image data are converted to luminance data by assigning a luminance value to each pixel in the image, based upon the intensity of light at the pixel. Since, if desired, the present invention can be applied in determining the sharpness of only a selected portion of the image, the step carried out in block 72 can optionally be implemented for only that selected portion of the image for which the sharpness of focus is to be determined or evaluated. More likely though, this step will convert the image data to luminance data for all pixels in the image.

An initial prototype of the present invention employed a relatively simplistic algorithm to determine the sharpness of the image as the focus control is adjusted. A block 74 in FIG. 3 indicates that appropriate algorithm is employed in carrying out this function. Details of the simplistic algorithm initially developed for this purpose are explained below. However, it is emphasized that other more efficient and more accurate algorithms can likely be developed and alternatively applied, or that modifications can be made to the algorithm discussed below to improve its capability in determining the sharpness of focus in one or more selected regions of an image.

Based upon the output of the algorithm implemented in block 74, a block 76 provides an indication of the current sharpness of focus to the user. This indication can either be visual or aural (or both). Details of several different embodiments for indicating the sharpness of focus are discussed below. In response to the indication provided in block 76, the user adjusts the focus of the camera, as indicated in a block 78. This manual step changes the focus of the camera as provided in block 70 until based upon the indication of sharpness of focus provided in block 76, the user determines that the sharpest possible or optimal focus has been achieved.

Algorithm for Determining Sharpness of Focus

In the algorithm that was employed in a first reduction to practice of the present invention, it is assumed that in a specified region, the total differences in luminance between adjacent pixels of the region will be maximized for the region when the lens of a camera is most sharply focused. In a blurred image that is not sharply focused, adjacent pixels in both the horizontal and vertical directions within the region will have less distinct differences in luminance, since the luminance of any bright objects or dark objects tends to be smeared over the adjacent pixels when the lens is poorly focused. However, as the focus is improved, the differences in luminance between adjacent pixels, particularly along the edges of objects or the edge of bright areas within an image region will increase, reaching a maximum when the image in the region is at its sharpest possible focus. Thus, the algorithm determines the sharpness of focus for an image in this exemplary embodiment of the present invention based upon a total of the differences in luminance between adjacent pixels in both the horizontal and vertical directions within a defined region or regions of the image and provides an indication of this total luminance value to the user as an indication of the sharpness of focus in the region or regions. Since, due to the delay in processing the image for a current focus condition, a user may not know when the sharpest possible or optimal focus has been obtained, until the focus control has been turned past that state, the indication also includes a maximum indicator. As the user adjusts the focus, the indication of sharpness of focus will increase as the sharpness improves, and will eventually reach a maximum. As the user continues to adjust the focus control in the same direction, the indication of sharpness of focus will decrease below this maximum. However, since the maximum that was achieved is indicated to the user, it is possible for the user to readily reverse the direction in which the focus control was adjusted, and return the adjustment of the control to achieve the maximum that was previously noted.

In the following exemplary lines of software code, the total luminance in a central portion of a 640×480 pixel image is determined. The central portion is 160×120 pixels in size and in this example, is the region in which the sharpness of focus is evaluated. The region is identified in the following code by the parameters EvalWidth for the width of the central region and EvalHeight for the height of the central region. It should be noted that the software code can be readily changed to include other regions beside the central region or to include regions around the periphery of the image, in addition to the central region. One improvement that is contemplated is the use of different weighting factors for the regions. Relatively inexpensive cameras have lenses that provide a sharp focus around the periphery of the image at one setting of the focus adjustment, and provide a sharp focus in the central portion of the image at a slightly different focus adjustment. For such cameras, it may be preferable to apply an appropriate weighting to the total of the differences in luminance for adjacent pixels determined for the central portion of the image and a different weighting to the total determined in peripheral regions of the image so that an optimum focus is achieved under the condition in which neither the total for the peripheral region, nor the total for the central region is at a maximum value. In most cases, preference (i.e., a greater weighting factor) will be given to sharpness of focus in the central region, since subjects of interest an image are typically disposed closer to the central portion of the image. The exemplary software code that only considers the central portion of the image is as follows.

```
//Image luminance is stored in array ImageLuminance
ImageWidth=640;
ImageHeight=480;
EvalWidth=160;
EvalHeight=120;
EvalXOffset=ImageWidth/2-EvalWidth/2; //this is true
    for a evaluation region in the middle of the image
EvalYOffset=ImageHeight/2-EvalHeigh/2; //this is true
    for a evaluation region in the middle of the image
Sharpness=0;
//compute horizontal sharpness
for (y=EvalYOffset; y<EvalYOffset+EvalHeight-1; y++)
for (x=EvalXOffset; x<EvalXOffset+EvalWidth-1; x++)
    Sharpness+=abs(ImageLuminance[y][x]-ImageLuminance[y][x+1]);
//compute vertical sharpness
for (x=EvalXOffset, x<EvalXOffset+EvalWidth-1; x++)
for (y=EvalYOffset; y<EvalYOffset+EvalHeight-1; y++)
    Sharpness+=abs(ImageLuminance[y][x]-ImageLuminance[y+1][x]).
```

Figure 8A:
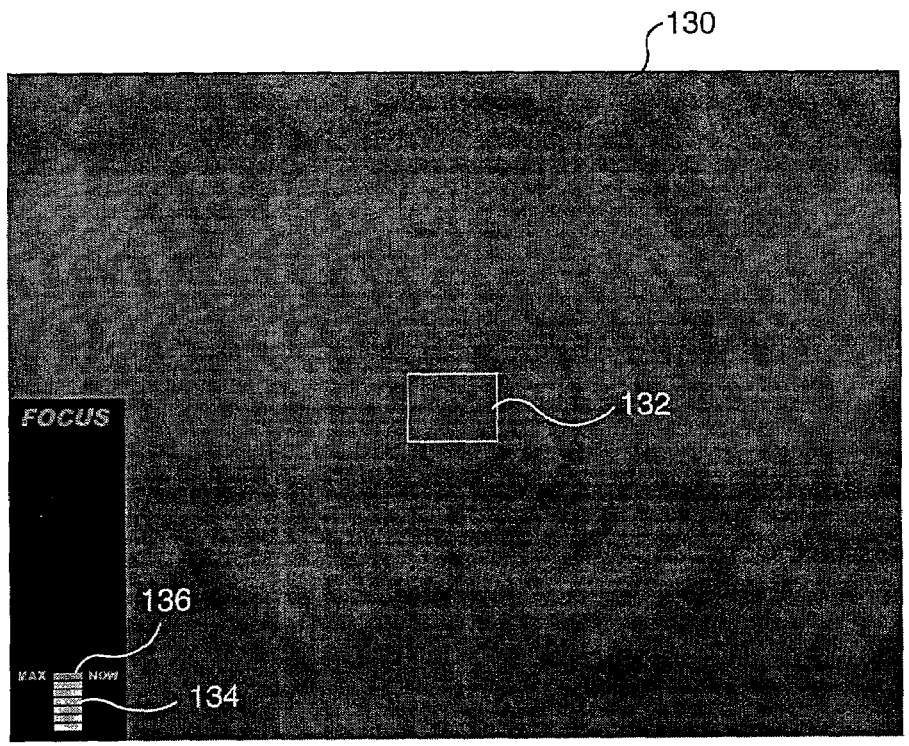
FIGS. 8A–8D illustrate images of a grid obtained from a digital camera and displayed by a PC, showing changes that occur in the image and an indicator as the digital camera is focused.
Figure 8B:
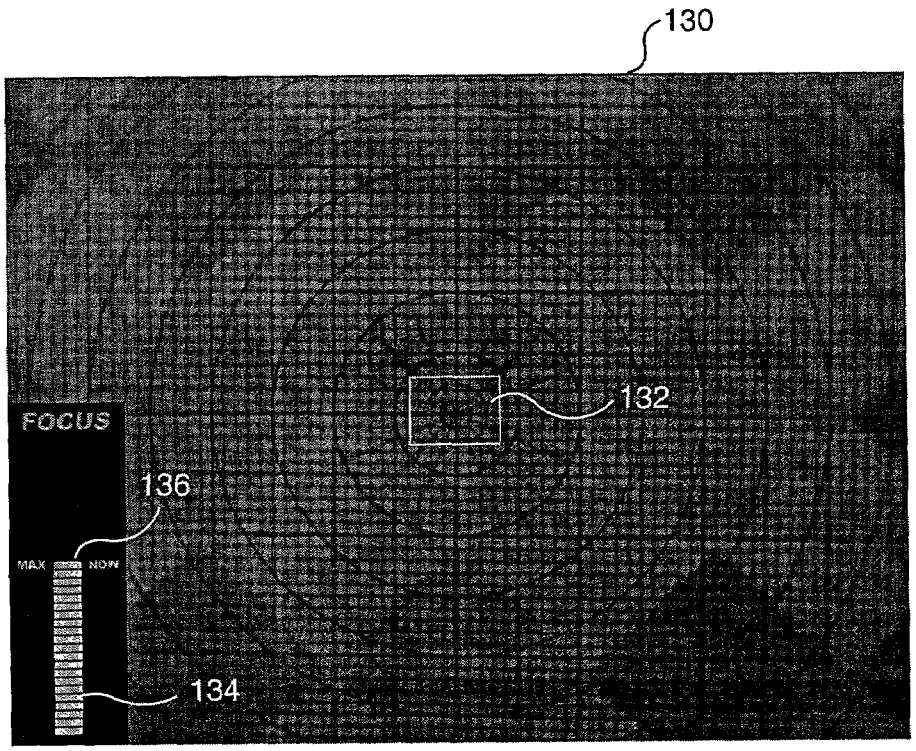

FIGS. 8A–8D illustrate an example in which the above algorithm is implemented to assist in focusing an image of a grid, based upon the sharpness of focus in the central portion of the image. In this example, an image 130 displayed on a computer monitor is produced from the image data signal supplied by the PC camera. Image 130 changes as illustrated in FIGS. 8A–8D, as the user adjusts the focus of the PC camera. Only a central region 132 is used in determining the sharpness of focus in this example. In FIG. 8A, it is apparent that image 130 is relatively blurred, since the camera lens is not properly focused. A visual indication of focus in the form of a bar graph 134 is included with image 130. A maximum sharpness of focus indication 136 is included in the bar graph, and changes as the focus is improved and a greater maximum sharpness value is computed. In FIG. 8B, the user has adjusted the focus of the camera, substantially improving the sharpness of focus in image 130 compared to that shown in FIG. 8A. A more objective indication of the improvement is apparent from the greater height of bar graph 134 and the increased value of maximum indication 136.

Figure 8C:
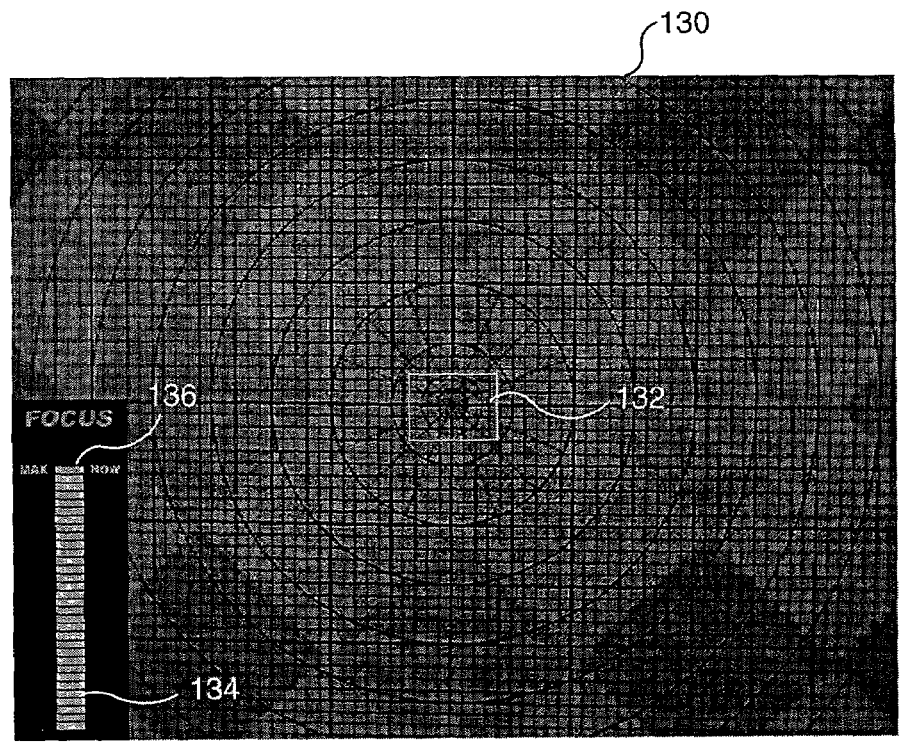

As the user continues to rotate the focus control in the same direction, a still more improved focus is obtained for image 130 as shown in FIG. 8C. This improvement is evident both in the appearance of image 130 in this Figure, since both the circular and radial lines in the image are now relatively sharply focused, and in the substantially greater height of bar graph 134 and substantially greater value of maximum indication 136.

Figure 8D:
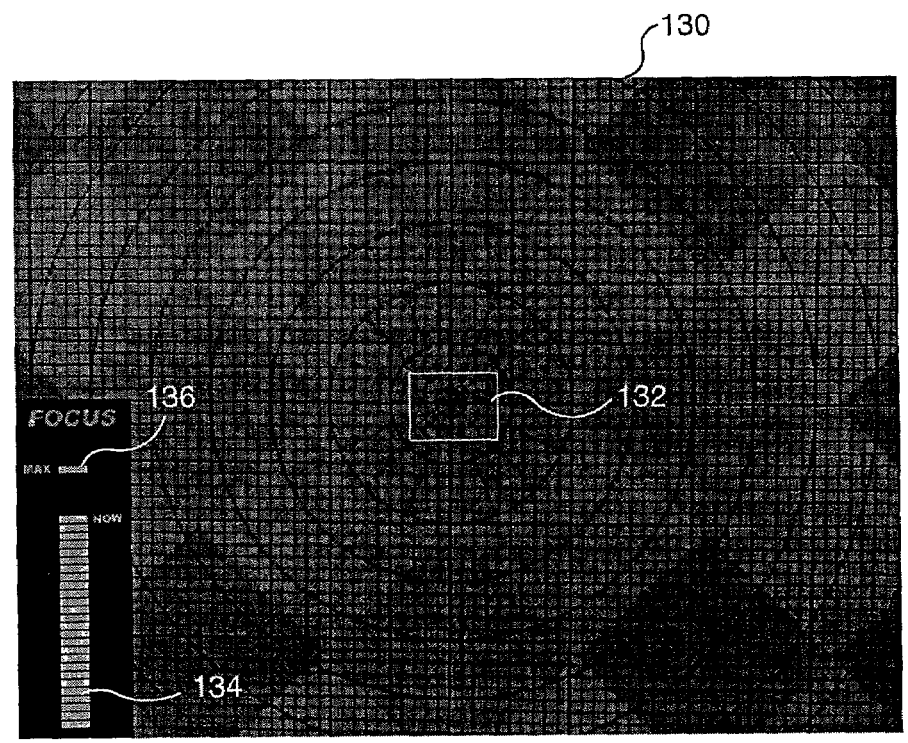

Finally, in FIG. 8D, as the user continues to rotate the focus adjustment in the same direction, the sharpness of focus of image 130 deteriorates. This reduced sharpness of focus is evident in the blurring of the circular and radial lines in image 130 in FIG. 8D and in the reduced height of the bar graph 134. However, while a reduction in the height of bar graph 134 has occurred in FIG. 8D compared to FIG. 8C, maximum indication 136 remains at its previous highest value, alerting the user that the direction in which the adjustment was last turned should be reversed, to achieve the sharper focus shown in FIG. 8C. Since maximum indication 136 is provided on the bar graph, the user can readily make fine tuning adjustments to the focus control until bar graph 134 is again equal in height to the maximum indication of FIG. 8C, which corresponds to the sharpest possible focus.

Camera Implemented Embodiment

From the preceding discussion of FIGS. 8A–8D, it will be apparent that a visual indication provided on monitor 47 of PC 20 was employed to assist the user in achieving the sharpest possible focus of PC camera 10 (shown in FIG. 1). The algorithm used to determine the sharpness of focus is in this case carried out as PC 20 executes corresponding software instructions stored in memory, which also cause the PC to display bar graph 134 and maximum indication 136. However, it is also contemplated that this or other appropriate algorithm used to determine the sharpness of focus can instead be implemented by a processor included within a camera and that a visual or aural indication of the sharpness of focus can be provided to a user of the camera without need for an algorithm to executed by a host computing device. In this case, the camera can be used in a standalone mode, without being coupled to a PC or other host computing device, or even if so coupled, need not require that the algorithm be executed by the PC or other host computing device.

Figure 4:
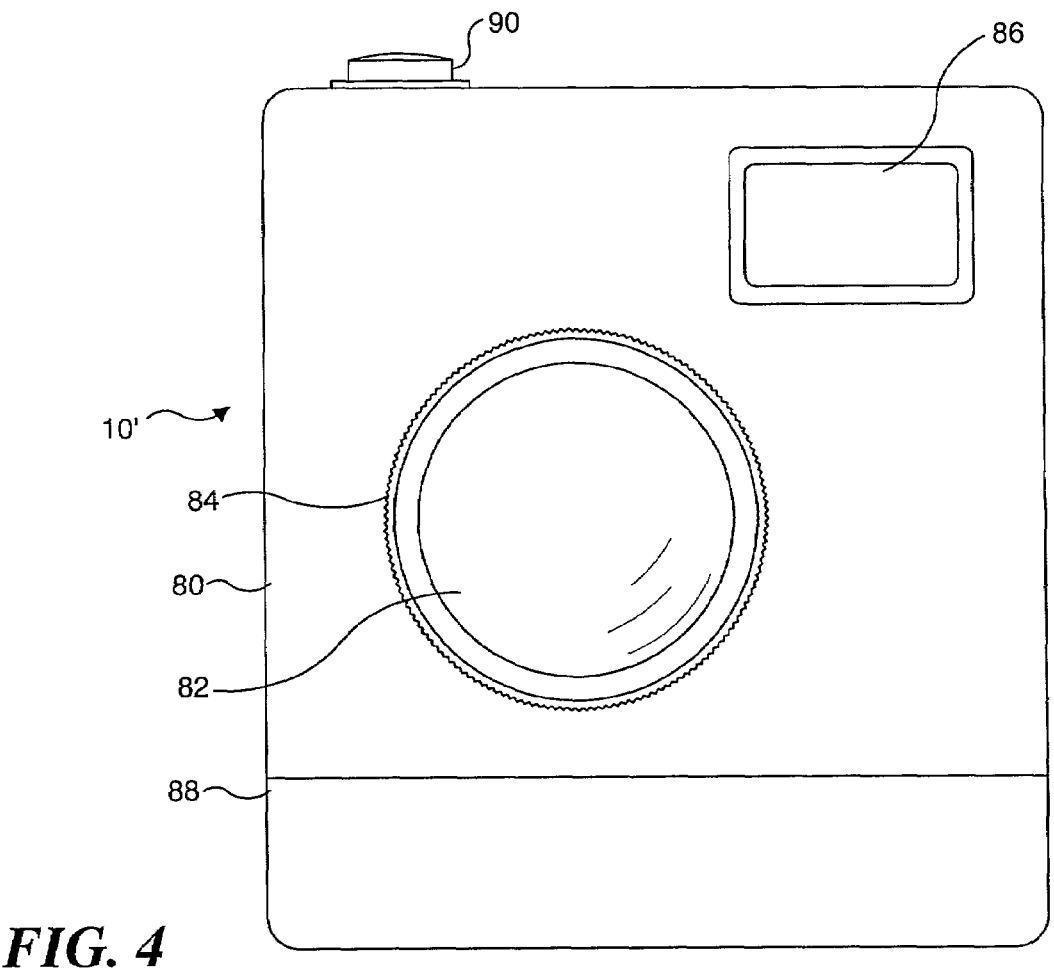
FIG. 4 is a front elevational view of a digital camera that includes a processor for implementing the present invention.

FIGS. 4–7 illustrate a camera 10' that has the ability to determine the sharpness of focus of an image as a user manually adjusts the focus of the camera. As shown in FIG. 4, camera 10' includes a housing 80, a lens 82 coupled to the front of the housing, and a focus bezel ring 84 for adjusting the focus of lens 82. As focus bezel ring 84 is rotated, the focus of lens 82 is manually adjusted by a user, typically with the goal being to achieve an optimal focus or the sharpest possible focus of an image produced by the camera. Camera 10' includes a battery pack 88 on the base of housing 80 that supplies the electrical energy required by the camera, enabling it to be decoupled from a PC or other host computing device to which it may optionally be coupled to transfer a video clip or still images. While not shown, it is contemplated that a control will be provided for selectively determining whether the camera captures individual frames or video clips when a release button 90 is depressed. Camera 10' also optionally includes a viewfinder 86 (not coupled to the lens) to assist the user in framing an image that is to be captured as a single frame or video clip by the camera.

As shown in FIG. 5, the back surface of camera 10' includes one of at least three different indicators of the relative sharpness of the image being viewed by the camera. A digital indicator 94 provides a digital indication of the relative sharpness of focus of the image and this indication changes as the user manually adjusts the focus of the camera. If the user continues to adjust the focus past the point of sharpest focus, a decrease in the value will be evident, so that the user can reverse the direction of adjustment to return to the maximum value that was achieved. It is also contemplated that the digital value can begin alternately displaying the current value and the maximum value that was previously achieved during the focusing operation.

An alternative visual indication is provided by an analog meter 96, which includes a needle 98 that changes position as the user adjusts the focus of the camera. As the sharpness of focus improves, needle 98 moves further toward the right side of the scale, but as the user passes the point of sharpest focus, needle 98 will begin moving toward the left, indicating that the user has passed through the point of sharpest possible focus. By observing the relative position of needle 98, the user can thus adjust the focus to achieve the sharpest possible or optimal focus condition.

Yet another visual focus indicator is indicated by a plurality of LEDs 100, which may be of different color to indicate a relative condition of focus. For example, the right-most LED can be a yellow color, while the left-most LED is a red color. The other LEDs will be shades of orange between these two colors. As the user adjusts the focus of the camera, the LED that is lighted will shift toward the right, indicating an improved sharpness of focus. While only five LEDs 100 are indicated, it is also contemplated that substantially more LEDs can be used, or that a LED-type bar graph can be employed, operating generally like the bar graph described above in connection with PC camera 10.

FIG. 7 illustrates how a bar graph 120 can be included within an image field 124 of viewfinder 86. Bar graph 120 includes a maximum indication 122 that is positioned to indicate the maximum sharpness thus achieved while adjusting the focus of camera 10'. Bar graph 120 can be implemented as a liquid crystal display (LCD) within viewfinder 86, or as a separate LCD screen that displays image field 124.

In addition to or as an alternative to any of the visual indications of the sharpness of focus described above, the present invention can optionally include an aural indication of the sharpness of focus produced with a sonic transducer 92, which is disposed on the back of camera 10'. An audible signal is produced by sonic transducer 92 as the user manually adjusts the focus of camera 10'. As the sharpness of focus is improved, the frequency of the signal increases, while a reduction in the sharpness of focus causes the audible signal to decrease in frequency. Alternatively, the sharpness of focus could be indicated by amplitude or by other audible characteristics of the sound produced by sonic transducer 92. By simply listening to the audible tone produced by sonic transducer 92, the user can thus audibly determine when the sharpest possible or optimal focus of the camera has been achieved.

Further details of the functional components employed within camera 10' are illustrated in FIG. 6. As shown therein, the light passing through manually focused lens 82 is incident on a CCD array 114 that produces the image data signal. The image data signal is applied to an A-D converter and interface 116, which converts the analog signal to digital luminance values for each pixel in at least a selected region of interest in which the sharpness of focus is to be monitored. The luminance data in digital form are provided to a central processing unit (CPU) 110. Machine instructions and other data are stored in a memory 112 that includes both ROM and RAM. These machine instructions cause CPU 110 to implement the algorithm described above or some other appropriate algorithm to determine the sharpness of focus. Based upon the relative sharpness value determined by implementing the algorithm, CPU 110 drives an indicator 118, which is either visual, aural, or both. Electrical current for CPU 110 and each of the other components in camera 10' is provided by battery pack and power supply 88.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for assisting a user to manually focus a camera, comprising the steps of:
   (a) processing image data produced by the camera to produce a sharpness value that is indicative of a sharpness of focus of the camera in at least a portion of an image, the image data comprising a luminance value for each of a plurality of pixels comprising the image, and the sharpness value being determined based on differences in luminance between the plurality of pixels comprising the image;
   (b) enabling the user to manually focus the camera; and
   (c) providing an indication of the focus of the camera to the user as the user manually focuses the camera, to enable the user to adjust the focus of the camera to selectively achieve the sharpest focus possible.

2. The method of claim 1, wherein said step of processing comprises the steps of:
   (a) determining a luminance value for pixels disposed in at least said portion of the image;
   (b) comparing the luminance value of adjacent pixels disposed in at least said portion of the image to determine the differences in their luminance values; and
   (c) determining the sharpness value as a function of the differences in the luminance values of adjacent pixels in at least said portion of the image.

3. The method of claim 2, wherein the step of determining the sharpness value comprises the step of determining a running total of the differences between the luminance values of adjacent pixels in both a horizontal and a vertical direction.

4. The method of claim 2, wherein at least said portion of the image comprises at least one of a central portion of the image and side portions of the image.

5. The method of claim 4, further comprising the step of weighting the luminance values in selected regions of the image included within at least said portion of the image when determining the sharpness value.

6. The method of claim 1, wherein the step of providing an indication comprises the step of displaying a visual indicator corresponding to the sharpness value so that the focus of the camera is visually perceived by the user viewing the visual indicator.

7. The method of claim 6, wherein the step of displaying a visual indicator comprises the step of displaying a graphical indicator of the sharpness value.

8. The method of claim 7, wherein in the step of displaying a visual indicator further comprises the step of indicating a maximum of the sharpness value on the graphical indicator so that as the user adjusts the focus of the camera past a point of sharpest focus, the user is enabled to reverse the adjustment of the focus back to the point of sharpest focus corresponding to the maximum of the sharpness value.

9. The method of claim 1, wherein the step of providing an indication comprises the step of producing an audible sound indicative of the user achieving the sharpest focus as the user focuses the camera.

10. The method of claim 1, further comprising the step of enabling the user to link the camera in data communication with a host computing device so that the step of digitally processing the image data is carried out by the host computing device.

11. The method of claim 1, wherein the step of processing the image data is carried out by a logic device included within the camera; and wherein the step of providing an indication uses at least one of an audible indication and a visual indication.

12. The method of claim 11, wherein the audible indication comprises a sound having a varying audible frequency indicative of the sharpness value.

13. The method of claim 11, wherein the visual indication comprises at least one of a light having a varying color indicative of the sharpness value, and a digital display of a number indicative of the sharpness value.

14. The method of claim 1, wherein the step of processing the image data includes the step of determining a weighted average of luminance for different regions of the image.

15. A memory medium on which machine readable instructions are stored, said machine readable instructions, when implemented by a processor, causing steps (a) and (c) in claim 1 to be carried out.

16. A method for assisting a user to focus a camera that is coupled to a host computing device on which an image produced using image data from the camera is displayed, said method comprising the steps of:
   (a) digitally processing the image data from the camera using the host computing device, to determine a sharpness value indicative of a focus of the camera, wherein the image data that are processed comprise a luminance value for each of a plurality of pixels comprising the image, and the sharpness value being determined based on differences in luminance between the plurality of pixels comprising the image;
   (b) in response to changes in the focus caused by the user adjusting the focus of the camera, again determining the sharpness value by digitally processing the image data; and
   (c) indicating the sharpness of focus of the camera to the user as a function of the sharpness value.

17. The method of claim 16, wherein said step of digitally processing comprises the steps of:
   (a) determining a luminance value for pixels comprising the image;
   (b) comparing the luminance value of pixels that are adjacent to each other to determine the differences in the luminance values; and
   (c) determining the sharpness value as a function of the differences in the luminance values.

18. The method of claim 17, wherein the pixels are disposed in one or more predetermined regions of the image.

19. The method of claim 17, wherein the step of digitally processing further comprises the step of determining a running total of the differences in at least one of a horizontal and a vertical direction.

20. The method of claim 17, wherein the step of digitally processing further comprises the step of weighting the difference in the luminance for pixels in at least one predefined portion of the image, when determining the sharpness value.

21. The method of claim 16, wherein the step of indicating comprises the step of providing at least one of a visual and an aural indication of the sharpness value as the user adjusts the focus of the camera.

22. The method of claim 21, wherein the step of providing the visual indication includes the steps of:
   (a) displaying a graphical indication of the sharpness value; and
   (b) displaying an indication of a maximum of the sharpness value that is achieved as a result of the user adjusting the focus of the camera, so that having adjusted the focus past a sharpest possible focus corresponding to the maximum, the user can readily adjust the focus back to the sharpest possible focus indicated by the maximum that was previously achieved.

23. A system that provides an indication of sharpness of focus to assist a user in focusing an image, comprising:
   (a) a camera that includes a lens having a manually adjustable focus control, said camera including a light sensor that produces image data in response to light passing through the lens;
   (b) a logic device coupled to receive the image data from the light sensor;
   (c) an indicator, coupled to the logic device, said indicator being adapted to provide an indication of a sharpness of focus of the lens; and
   (d) said logic device being configured to implement a plurality of functions, including:
      (i) determining a luminance value for each of a plurality of pixels comprising the image data, and the sharpness value, based on differences in luminance between the plurality of pixels comprising the image;
      (ii) processing the luminance values determined for the image data to determine a sharpness value indicative of a focus of the lens; and
      (iii) indicating to a user the focus of the lens with the indicator, as a function of the sharpness value, so that a user can determine when the lens is sharply focused.

24. The system of claim 23, wherein at least one of the logic device and the indicator are disposed within the camera.

25. The system of claim 24, wherein the indicator comprises at least one of an audio indicator and a visual indicator.

26. The system of claim 25, wherein the visual indicator comprises at least one of a light having a color that is indicative of the sharpness value, and a numeric indicator that indicate the sharpness value.

27. The system of claim 25, wherein the audio indicator produces an audible sound having a frequency that is indicative of sharpness value.

28. The system of claim 23, wherein the camera is adapted to couple to a host computing device in which at least one of the logic device and the indicator are disposed.

29. The system of claim 23, wherein said logic device:
   (a) compares the luminance value of pixels that are adjacent to each other to determine the differences in their luminance values; and
   (b) determines the sharpness value as a function of the differences in the luminance values.

30. The system of claim 29, wherein the pixels are disposed in one or more predetermined regions of the image.

31. The system of claim 29, wherein the processor determines a running total of the differences in at least one of a horizontal and a vertical direction.

32. The system of claim 29, wherein the logic device weights the difference in the luminance for pixels in at least one predefined portion of the image, when determining the sharpness value.

33. A logic device-readable medium having machine instructions, which when executed by a logic device, cause a plurality of functions to be implemented, including:
   (a) processing image data from a camera to produce a sharpness value that is indicative of a sharpness of focus of a lens of the camera in at least a portion of an image, wherein the image data that are processed comprise a luminance value for each of a plurality of pixels comprising the image, and wherein the sharpness value is determined based on differences in luminance between a plurality of pixels comprising the image; and
   (b) in response to a user manually focusing a lens of the camera so as to change the sharpness value, providing an indication of the focus, to enable a user to selectively improve a sharpness of focus.

34. The logic device-readable medium of claim 33, wherein said machine instructions cause the logic device to:
   (a) determine a luminance value for pixels disposed in at least said portion of the image;
   (b) compare the luminance value of adjacent pixels disposed in at least said portion of the image to determine the differences in their luminance values; and
   (c) determine the sharpness value as a function of the differences in the luminance values of adjacent pixels in at least said portion of the image.

35. The logic device-readable medium of claim 34, wherein said machine instructions determine the sharpness value by determining a running total of the differences between the luminance values of adjacent pixels in both a horizontal and a vertical direction.

36. The logic device-readable medium of claim 34, wherein at least said portion of the image comprises at least one of a central portion of the image and side portions of the image.

37. The logic device-readable medium of claim 36, wherein the machine instructions further cause the logic device to weight the luminance values in selected regions of the image included within at least said portion of the image when determining the sharpness value.

38. The logic device-readable medium of claim 33, wherein the machine instructions cause a visual indicator to be displayed and varied as a function of the sharpness value, so that the a focus of the lens is visually perceived by a user viewing the visual indicator.

39. The logic device-readable medium of claim 38, wherein the machine instructions cause a graphical indicator to be displayed to indicate the sharpness value.

40. The logic device-readable medium of claim 38, wherein the machine instructions further cause the logic device to indicate a maximum of the sharpness value on the graphical indicator so that as a user adjusts the focus past a point of sharpest focus, a user is enabled to readily reverse the adjustment of the focus back to the point of sharpest focus, corresponding to the maximum of the sharpness value.

41. The logic device-readable medium of claim 33, further comprising an audio transducer coupled to the logic device, wherein the machine instructions cause the logic device to produce an audible sound indicative of a user achieving the sharpest focus as a user focuses the lens.

42. The logic device-readable medium of claim 41, wherein the audible sound has a varying audible frequency indicative of the sharpness value.

43. The logic device-readable medium of claim 33, wherein the indication of focus comprises at least one of a colored light display, and a numeric display.

44. The logic device-readable medium of claim 33, wherein the machine instructions further cause the logic device to determine a weighted average of luminance for different regions of the image and to provide the indication of sharpness of focus as a function of the weighted average.

* * * * *